Sheet 1. 3 Sheets.

M. Guild.
Cordage Mach.

N° 6,441.    Patented May 8, 1849.

Sheet 2. 3 Sheets.

M. Guild.
Cordage Mach.

Nº 6,441. Patented May 8, 1849.

Sheet 3. 3 Sheets

M. Guild.
Cordage Mach.

N° 6,441. Patented May 8, 1849.

UNITED STATES PATENT OFFICE.

MARTIN GUILD, OF EASTON, MASSACHUSETTS.

IMPROVEMENT IN MACHINERY FOR LAYING ROPES.

Specification forming part of Letters Patent No. 6,441, dated May 8, 1849.

*To all whom it may concern:*

Be it known that I, MARTIN GUILD, of Easton, in the county of Bristol and State of Massachusetts, have invented certain new and useful Improvements in Machinery for Laying Cords or Ropes; and I do hereby declare that the same is fully described and represented in the following specification and accompanying drawings, letters, figures, and references thereof.

Figure 1:
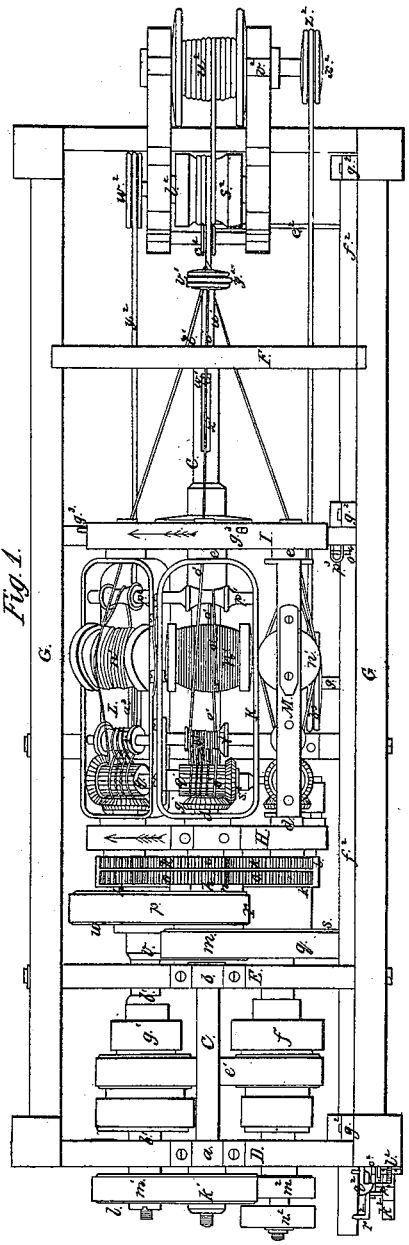
Figure 2:
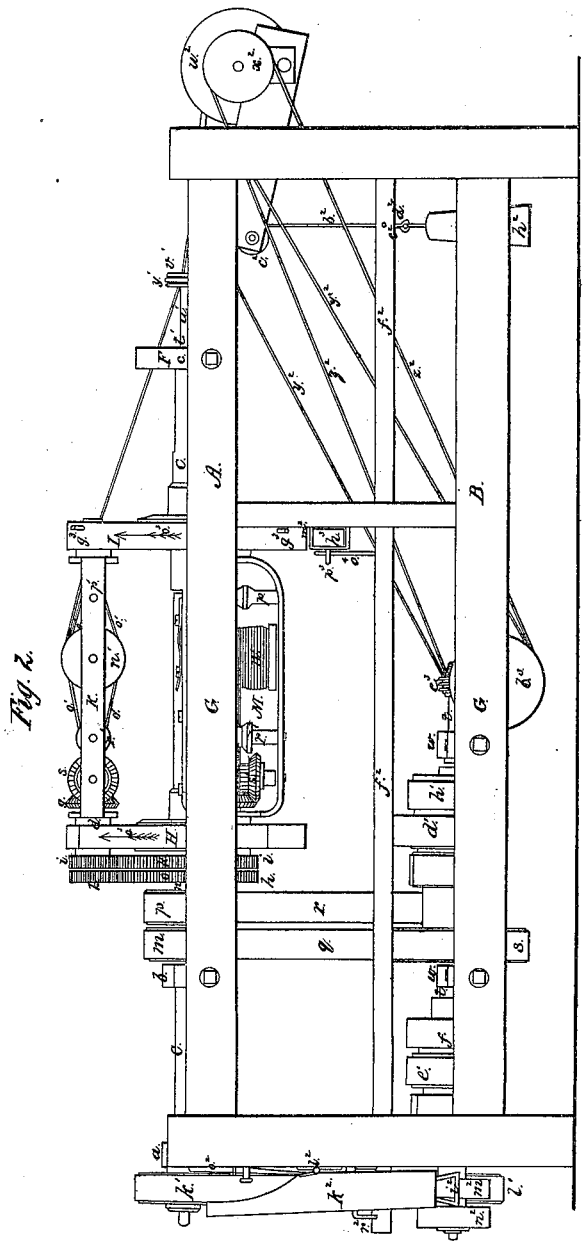
Figure 4:
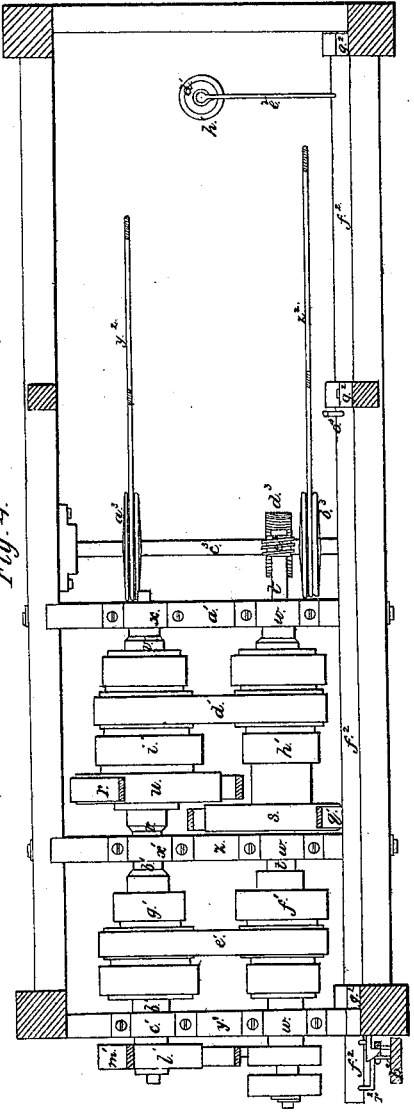
Figure 3:
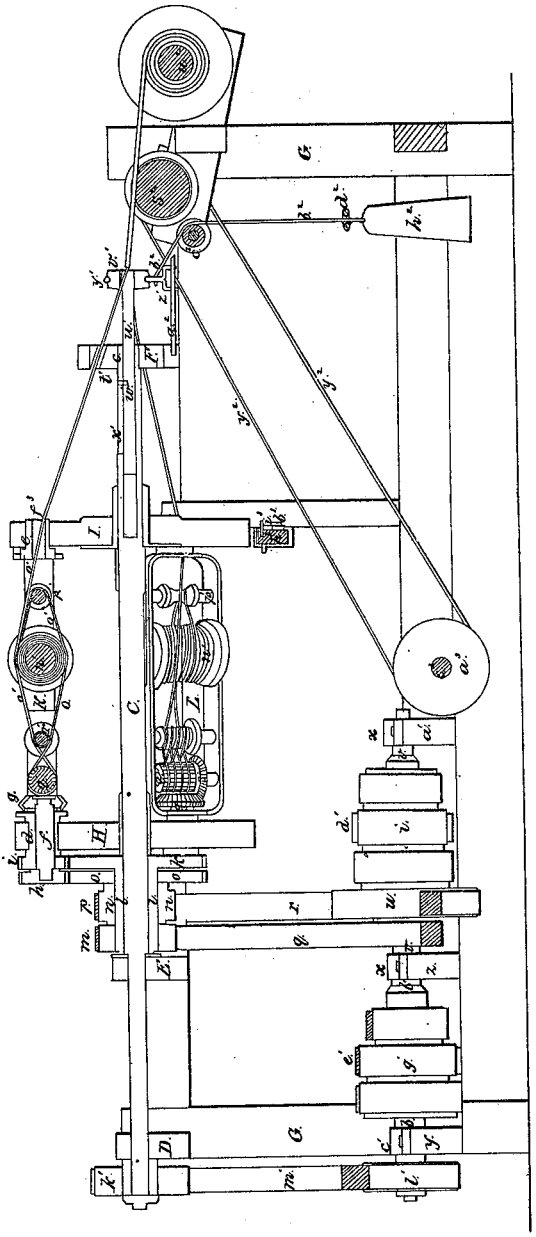
Figure 5:
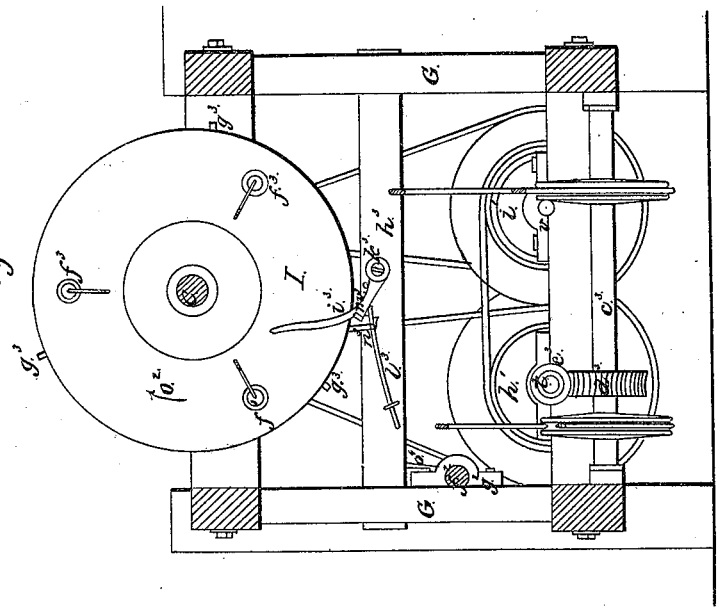

Of the said drawings, Figure 1 denotes a top view of my improved machine; Fig. 2, a front elevation of it. Fig. 3 is a central vertical and longitudinal section of it. Fig. 4 is a horizontal section taken at about half the height of the main frame. Fig. 5 is a transverse and vertical section taken on line from A to B, Fig. 2.

In Figs. 1, 2, 3, and 5 of the said drawings, C represents a long shaft or spindle supported and so as to revolve in suitable bearings attached to cross-bars D E F of the main frame G, the said bearings being seen at $a\ b\ c$. Two circular flier-heads H I are arranged upon the said shaft C in the positions with regard to one another, as denoted in Fig. 1, the said heads being made to carry and support three or any other suitable number of fliers K L M, whose necks $d\ e$ revolve in bearings formed within the heads. While both necks of each of said fliers are made tubular or hollow, each neck $d$ thereof is caused to receive a short cylindrical shaft $f$, which passes through it and revolves within it as a bearing, there being a bevel-gear $g$ on one end of each shaft $f$ and a spur-gear $h$ on the other end of the same, the flier-neck $d$ having a similar spur-gear $i$ affixed upon it, the whole being arranged as seen in the drawings. The spur-gears $i\ i\ i$ of the necks of the fliers engage with one large gear-wheel $k$, fixed on a tubular shaft $l$, which is placed and revolves freely on the main shaft or spindle C, and has a driving-pulley $m$ attached to its outer end. A second tubular shaft $n$ is disposed and revolves freely on the shaft $l$, and has a gear-wheel $o$ and a driving-pulley $p$ affixed upon it in the positions denoted in the drawings, the said gear-wheel being for the purpose of engaging with and revolving the several small gears $g\ g\ g$ and their shafts $f\ f\ f$.

The driving-pulleys $m$ and $p$ are respectively rotated by endless belts $q\ r$, the former of which extends around a pulley $s$ on a horizontal shaft $t$, while the latter extends about a pulley $u$ on a horizontal shaft $v$, arranged as seen in the drawings, the first of the said two shafts being about twice the length of the second and supported and made to revolve in three boxes or bearings $w\ w\ w$, affixed to cross-rails $y\ z\ a'$ of the main frame. The other shaft is supported and turns in two boxes $x\ x'$, the latter of which boxes also receives the journal or end of a third shaft $b'$, whose opposite end is supported in a box $c'$.

The shaft $t$ is the main driving-shaft of the machine and gives motion to the two shafts $v$ and $b'$ by means of two endless belts $d'\ e'$, each of which is made to work two drums or sets of cone-pulleys $f'\ g'$ or $h'\ i'$, disposed on the shafts, as seen in the drawings.

The main spindle C has a pulley $k'$ fixed on one end of it, around which pulley and another pulley $l'$, fixed on the shaft $b'$, an endless belt $m'$ extends, the rotatory motion of the spindle being obtained by such means from that of the shaft $b'$.

Each flier carries a bobbin $n'$, which is disposed transversely between the arms or sides of the flier, as seen in the drawings. The strand $o'$ from the said bobbin is led toward and over a guide-roller $p'$, placed near the front neck of the flier and having its axis parallel with that of the bobbin. From thence the strand leads to the delivery machinery, which consists of a fluted barrel or windlass $q'$ and a grooved barrel $r'$, arranged between the flier-arms, as seen in Fig. 1, and applied thereto, so as to be capable of revolving on their respective axes. The surface of the windlass is fluted or scored in a direction parallel to its axis, while that of the barrel $r'$ is grooved transversely. On the shaft of the windlass-barrel is a beveled gear $s'$, which engages with the gear $g$, before mentioned.

The strand $o'$, after leaving the guide-pulley $p'$, is carried under the bobbin and the grooved barrel $r'$. Thence it is made to pass upward over and around the windlass-barrel, thence upward and around the barrel $r'$ again, and after being carried in the above manner several times about said windlass-barrel and the barrel $r'$ it is thence made to pass over the bobbin and through the front flier-neck and toward and through a common directing-plate $t'$, fixed upon the spindle. Thence it is carried through the head of the guard, the same being done with each strand. The said guard consists of a long rod $u'$, having a circular head $v'$ affixed to one end of it. The rod $u'$ of the guard is inserted in the end of the spindle and is adapted to the spindle, so as to be capable of being slid into and out of the same. In order to prevent it from turning around laterally within the spindle, a small stud $w'$ is made to extend from the rod and to pass into a slot $x'$ cut in the spindle, as seen in Figs. 1 and 3. The head $v'$ of the guard is grooved around its periphery and receives in the groove a circular ring $y'$, an extension $z'$ of which slides upon a horizontal and stationary rod $a^2$, extending from the bar F of the frame. A cord $b^2$ is affixed at one end to the said extension, and is carried toward and over a pulley $c^2$, disposed as seen in Figs. 1 and 3. Said cord thence passes down vertically and through an eye $d^2$, formed on the end of an arm $e^2$, projecting from a long horizontal shaft $f^2$, disposed as seen in Figs. 2 and 4, and having its journals supported by suitable bearings $g^2 g^2 g^2$, affixed to the posts of the frame. Just below the arm $e^2$ a weight $h^2$ is fastened to the cord $b^2$.

Figure 6:
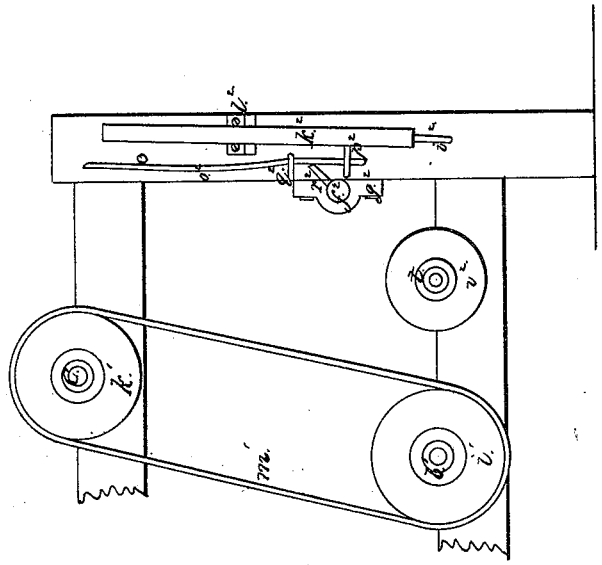

The belt which proceeds from the driving power and actuates the machine is made to pass through an eye $i^2$, made in the lower end of a shifting-lever $k^2$, hinged to the main frame at $l^2$. From the eye of the shifting-lever the belt passes to and around either a fast pulley $m^2$ or a loose pulley $n^2$, arranged upon the driving-shaft. A spring $o^2$, (see Fig. 6, which denotes a side view of the loose pulley and the shifting-lever and mechanism connected therewith,) affixed at its upper end to the post of the main frame, has its lower end passed through a staple $p^2$, inserted in the inner side of the shifting-lever, said spring being made in such manner as to press the lower end of the shifting-lever away from the posts of the frame. A catch or hook $q^2$ is inserted in the post and by the side of the spring and in such manner that when the lower arm of the shifting-lever is passed toward the post and far enough to carry the driving-belt upon the fast pulley the spring will pass against and by the hook or catch and be retained by it until thrown off the same by the pressure of a projection or wide arm $r^2$, extending from the horizontal shaft $f^2$. When so thrown off the catch, the spring so operates the shifting-lever as to move the driving-belt from the fast to the loose pulley, and in consequence thereof the motions of the machine will stop.

From the above it will be seen that whenever the arm $e^2$ is lifted high enough the shaft $f^2$ will be so revolved in its bearings as to press the arm $r^2$ against the spring $o^2$ and stop the machine. Now the said arm $e^2$ will be raised whenever the weight $h^2$ is drawn up, in consequence of the guard $u'$ being forced in a direction toward and into the spindle C, the said guard being so moved whenever any overtwisting together of the strands takes place. Therefore it will be seen that the purpose of the guard, its cord, and weight, the horizontal shaft, shifting-lever, and the apparatus connected therewith, as above specified, is to regulate or equalize the tightness of twist of the laying of the strands. If the tightness of twist increases beyond a certain extent, the strands will press back the guard, and thereby cause the machine to stop. When this takes place, the belt $e'$ must be shifted on its cones of pulleys, so as to produce a slower motion of the fliers. The strands, after being twisted together into a rope or cord, pass several times around a draft-roller $s^2$, fixed upon a horizontal shaft $t^2$, (arranged as seen in the drawings.) From thence the rope is received and wound upon a reel $u^2$, placed upon a shaft $v^2$, disposed as seen in the drawings. Each of the shafts $t^2 v^2$ has a grooved pulley $w^2$ or $x^2$ affixed to it, around which an endless belt $y^2$ or $z^2$, proceeding from a pulley $a^3$ or $b^3$, passes. The pulleys $a^3 b^3$ are fixed upon a horizontal shaft $c^3$, which is put in motion by a spur-gear $d^3$ and an endless screw $e^3$ operating together, the spur-gear being affixed on the shaft $c^3$, while the endless screw is attached to the main driving-shaft $t$.

The next portion of the machinery to be specified is that by which the motions of the machine are arrested whenever a strand breaks.

In the periphery of the front flier-head I and a little in advance of each strand-hole $f^3$ thereof a small pin $g^3$ is inserted and made to project therefrom, as seen in Fig. 5. Directly underneath the head I and in the plane thereof is a slide-bar $h^3$, which is supported so as to slide freely back and forth in the direction of its length or transversely of the machine. To the middle part of the bar $h^3$ a curved lever $i^3$ is applied and made to turn upon a fulcrum or screw-pin $k^3$, passed through the lower end of the lever and into the slide-bar. The upper end of the lever extends up above the circular path of the strands, so that when the head I is put in revolution the strands will be carried in succession against the lever and depress it. The lever is held up by a spring $l^3$, which spring is attached at one end to the slide-bar and at its other end bears against the lever. A short arm or stud $m^3$ is made to project horizontally from the lever $i^3$ and directly underneath the periphery of the head I. When the lever is depressed, the said arm $m^3$ is forced down into a notch or recess $n^3$, made in the top of the slide-bar.

The direction in which the flier-head I revolves being denoted by the arrow $o^3$ thereon, it will be seen from what has been described that whenever any one of the strands breaks (the head I being supposed to be in revolution) that it will not depress the lever $i^3$ when moved by it. Consequently the pin $g^3$ next to the hole $f^3$ of the broken strand will be carried against the arm $m^3$ in such manner as to so actuate the slide-bar as to cause it to slide in its bearings in a direction toward the shaft $f^2$, from which shaft an arm $o^4$ extends upward and through a staple $p^3$ driven into the slide-bar. In consequence of such movement of the slide-bar the shaft $f^2$ will be so turned as to operate on the spring of the shifting-lever and cause the driving-belt to be moved from the fast toward and upon the loose pulley.

In all the cord or rope laying machines which have come to my knowledge there appears to be one serious omission—viz., that of a means of delivering each strand in the proportion the twist thereof may require and at the same time with a sufficient draft on the strand to keep it straight. The common method of delivery is by drawing the strand from the bobbin by means of a roller made to operate after the twist is thrown in or produced in the strand and the strands are laid together. In such case the strands are kept straight either by friction applied to the bobbins or by each strand being wound several times around the arm of its flier. The draft produced in such manner is variable and uncertain, the work or twist being rendered by it more or less uneven.

By placing within each flier, as above specified, two delivering-rollers, the one being fluted longitudinally and the other grooved transversely, as described, and operating them and passing the strand about them, as above explained, the strand is held firmly and prevented from slipping and is regularly delivered from the bobbin and under a suitable degree of tension before any twist is put into it, (the strand,) the same draft or drag on the strands when laid together being produced by a drawing-roller $s^3$, as hereinbefore described.

What I claim therefore as my invention is—

1. A combination consisting of the guard, its rope and weight, and the lever-shaft $f^2$, with its arms, spring, shifting-lever, and catch, the whole being applied to the spindle C, essentially in manner and for the purpose as specified.

2. The combination, with the lever-shaft $f^2$, having arms $o^4$ $r^2$, spring, catch, and shifting-lever, as described, or any other suitable mechanical equivalent for shifting the driving-belt from the fast to the loose pulley, of the slide-bar $h^3$, the spring-lever $i^3$, having an arm $m^3$, and the pins $g^3$, inserted in the flier-head I, the said combination being for the purpose of arresting the motion of the machine on the breaking of a strand.

In testimony whereof I have hereto set my signature this 7th day of November, A. D. 1848.

MARTIN GUILD.

Witnesses:
JAMES GUILD,
HARRISON POOLE.